United States Patent Office 3,409,610
Patented Nov. 5, 1968

3,409,610
9α-DIFLUOROMETHYL AND 9α-TRIFLUORO-
METHYL PREGNENES
John H. Fried, Palo Alto, Calif., assignor to Syntex Corporation, Panama, Panama, a corporation of Panama
No Drawing. Filed June 27, 1966, Ser. No. 560,864
21 Claims. (Cl. 260—239.5)

This invention relates to novel cyclopentanophenanthrene derivatives. More particularly, the present invention relates to novel 9α-difluoromethyl and 9α-trifluoromethyl cyclopentanophenanthrene compounds and intermediates therefor.

Some of the novel compounds of the present invention are represented by the following formulas.

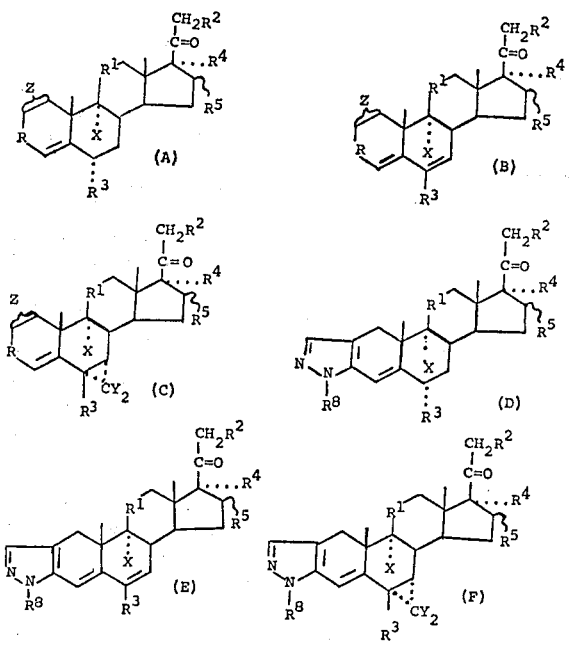

In the above formulas, X represents difluoromethyl or trifluoromethyl; Y represents hydrogen or fluoro; Z represents a saturated bond or an ethylenically unsaturated bond between C–1 and C–2; R represents >C=O or

wherein R″ represents hydroxy, a carboxylic acyloxy group of less than 12 carbon atoms, tetrahydropyran-2-yloxy or tetrahydrofuran-2-yloxy; R¹ represents >C=O or

$R^2$ represents hydroxy or a carboxylic acyloxy group of less than 12 carbon atoms; $R^3$ represents hydrogen, fluoro or methyl; $R^4$ represents hydrogen, hydroxy or a carboxylic acyloxy group of less than 12 carbon atoms; $R^5$ represents hydrogen, alpha hydroxy, alpha methyl or beta methyl; $R^4$ and $R^5$ together represent the group

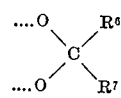

at the 16α,17α-position wherein each of $R^6$ and $R^7$ represent hydrogen or a hydrocarbon group of up to 8 carbon atoms; and $R^8$ represents hydrogen, phenyl, chlorophenyl, fluorophenyl, methoxyphenyl and methylphenyl, provided that when $R^5$ represents alpha hydroxy that $R^4$ represents hydroxy or a carboxylic acyloxy group of less than 12 carbon atoms.

The novel compounds of the present invention of the above formulas are valuable pharmacological agents having anti-flammatory and other desirable corticoid activities. They are administered in the usual pharmaceutical forms.

The carboxylic acyl or acyloxy groups of the compounds of the present invention contain less than 12 carbon atoms and may be of a straight, branched, cyclic or cyclic-aliphatic chain structure. This structure may be saturated, unsaturated, or aromatic and optionally substituted by functional groups such as hydroxy, alkoxy containing up to 5 carbon atoms, acyloxy containing up to 12 carbon atoms, nitro, amino, halogeno, and the like. Typical esters thus include acetate, propionate, enanthate, benzoate, trimethylacetate, t-butylacetate, phenoxyacetate, cyclopentylpropionate, aminoacetate, β-chloropropionate, adamantoate, and the like.

Compounds of the present invention embraced by Formula A can be prepared according to the following illustrated process.

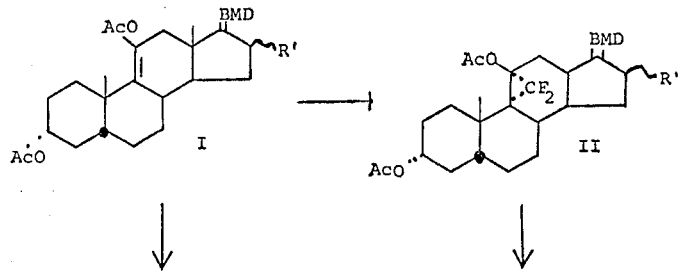

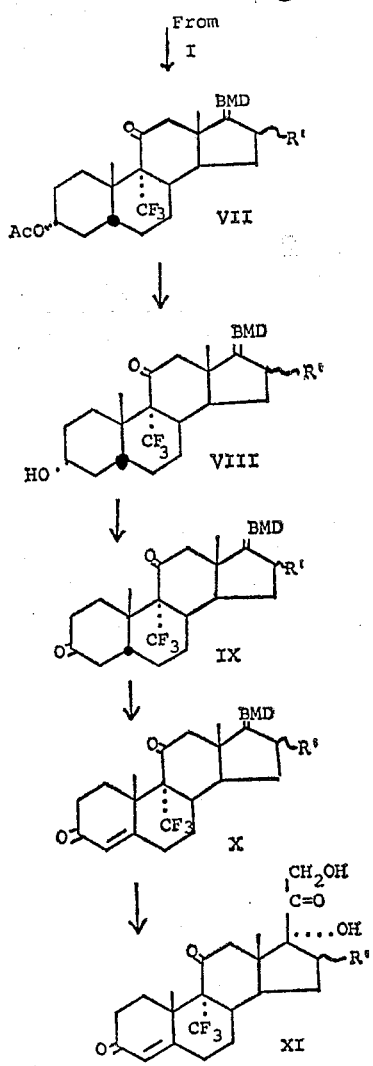

In the above formulas, R' represents hydrogen, alpha methyl or beta methyl, Ac is an acyl group of a hydrocarbon carboxylic acid of less than 12 carbon atoms, preferably acetyl, and BMD is the side chain protecting group 17α,20;20,21-bismethylenedioxy.

In practicing the above process for the preparation of the novel 9α-difluoromethyl derivatives (VI), i.e. the reaction sequence I–II–III–IV–V–VI, the starting material I is reacted with an alkali metal salt of chlorodifluoroacetic acid, e.g. sodium chlorodifluoroacetate, in an inert organic solvent, e.g. a glycol ether, to furnish the corresponding 9α,11α-difluoromethylene steroid II which upon treatment with a strong base, e.g. potassium hydroxide, in aqueous organic solvent such as an aqueous lower monohydric alcohol furnishes the 9α-difluoromethyl steroid III. Oxidation of the steroid III as by treatment with, for example, chromium trioxide in pyridine furnishes the 3-keto derivative IV which is then converted into the 3-keto-Δ⁴ steroid V by treatment with bromine and lithium chloride as described in detail hereinafter. Treatment of the steroid V with an acid, for example, aqueous formic acid, hydrofluoric acid, hydrochloric acid, and the like furnishes the 9α-difluoromethyl cortisone VI or alternatively the 16α-methyl or 16β-methyl derivative thereof (VI, R'=α-CH₃ or β-CH₃) depending upon the starting material.

In practicing the above process for the preparation of the novel 9α-trifluoromethyl cortisones XI of the present invention, i.e. the reaction sequence I–VII–VIII–IX–X–XI, the starting material I is treated with trifluoroiodomethane in the presence of a catalyst such as an organic peroxide or ultraviolet light to furnish the 9α-trifluoromethyl steroid VII. By subjecting the steroid VII to the procedure described hereinabove for the conversion of II–III–IV–V–VI, there is obtained the novel 9α-trifluoromethyl cortisones XI.

The starting material I can be obtained according to the following outlined process wherein Ac, BMD and R' are as defined hereinabove.

In practicing the above process, the starting compound XII is hydrolyzed as by treatment with a base in a lower alcohol to obtain the corresponding 21-hydroxy compound XIII. By treatment of the compound XIII with formaldehyde in the presence of hydrochloric acid the protecting group 17α,20;20,21-bismethylenedioxy is introduced to furnish the compound XIV which is then acylated at C-3 as by treatment with a hydrocarbon carboxylic anhydride, e.g. acetic anhydride in pyridine, to provide the 3α-acyloxy compound XV. Treatment of the compound XV with bromine in chloroform in the presence of a small amount of hydrogen bromide furnishes the 9α-bromo compound XVI which upon treatment with lithium in liquid ammonia followed by treatment with acetyl chloride furnishes the enol acetate I.

Compounds of the present invention according to Formulas VI and XI can be converted into the corresponding 1(2)-dehydro derivative by refluxing with selenium dioxide or 2,3-dichloro-5,6-dicyano-1,4-benzoquinone in, e.g., dioxane. This thus-obtained Δ$^{1,4}$-derivatives can be further dehydrogenated as by refluxing with chloranil in tertiary butanol to obtain the C-6,7-dehydro derivative i.e. a Δ$^{1,4,6}$-triene. Alternatively, the dehydrogenation at C-6,7 may be effected prior to the dehydrogenation at C-1,2 to obtain the Δ$^{4,6}$-diene derivatives of Formulas VI and XI.

The novel 9α-difluoromethyl and 9α-trifluoromethyl cortisones of the present invention and the corresponding C-1,2 and C-6,7 dehydro derivatives can be converted into the corresponding 3β-hydroxy and/or 11β-hydroxy derivative according to the following outlined process.

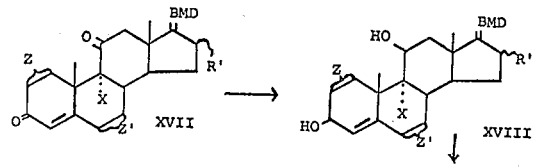

XIX. The 3-keto steroid XIX is then subjected to acid hydrolysis as by treatment with formic acid, acetic acid, hydrofluoric acid, or the like to remove the bismethylenedioxy side chain protecting group to form the steroid XX. The steroid XX is then esterified at C-21 as by treatment with for example, acetic anhydride in pyridine to obtain the corresponding 21-acylate XXI. Selective reduction of the steroid XXI at C-3 as by treatment with, e.g., lithium aluminum t-butoxide in an organic solvent, for example, tetrahydrofuran, furnishes the 3β,11β-diol XXII. The 21-ester group of the steroid XXII may be subjected to hydrolysis as, for example by treatment with a base in an aqueous organic solvent to obtain the corresponding free 21-alcohol.

In practicing the above process, dehydrogenation at C-1,2 and/or C-6,7 may be performed before or after carrying out the described procedure. The dehydro derivatives may be prepared in the manner described hereinabove.

The 3β-acylate or 3β-ether derivatives of the 9α-trifluoromethyl and 9α-difluoromethyl compounds of the present invention can be obtained by conventional acylation and etherification methods known in the art. Thus, treatment of the steroid XXII with, for example, a carboxylic anhydride or an acyl chloride in an organic solvent, e.g. pyridine furnishes the corresponding 3β-acylate, e.g. the 3β-acetate. Alternatively, treatment of steroid XXII with dihydropyran or dihydrofuran in the presence of, e.g., para-toluenesulfonyl chloride furnishes the corresponding 3β-tetrahydropyran-2-yl ether or 3β-tetrahydrofuran-3-yl ether. Thereafter, if desired, the 11β-hydroxy group may be oxidized as by treatment with manganese dioxide or 2,3-dichloro-5,6-dicyano-1,4-benzoquinone in tetrahydrofuran to obtain the 11-keto derivative. Preferably, the 11β-hydroxy substituent is converted into the 11-oxo before removal of the acylate at C-21. The 21-acylate group may be removed after oxidation at C-11, if desired, by hydrolysis with, e.g., potassium hydroxide in an aqueous alcohol to obtain the free 21-alcohol.

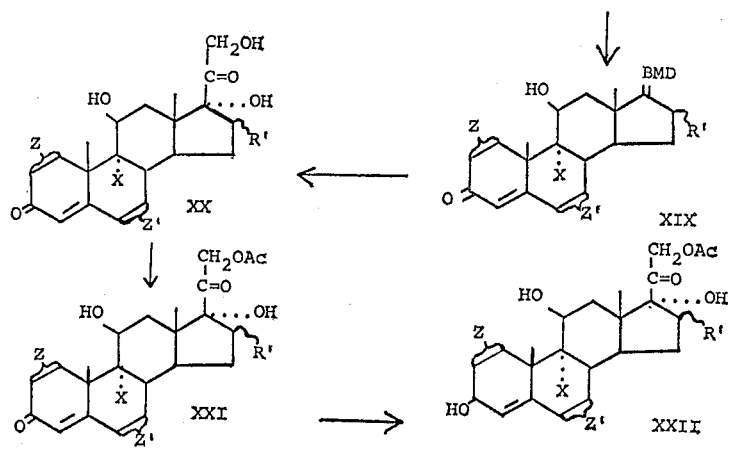

In the above formulas X, R', Ac, Z and BMD are as defined hereinabove and Z' is a saturated bond or an ethylenically unsaturated bond between C-6 and C-7. In practicing the above-outlined process the steroid material XVII is reduced to the 3β,11β-diol compound XVIII as by treatment with sodium borohydride in an organic solvent which is thereafter selectively oxidized at C-3 by treatment with, for example, manganese dioxide and tetrahydrofuran to obtain the 3-keto derivative The compounds of the present invention having an alpha hydroxy group at C-16, i.e. compounds according to, for example, Formula A wherein R$^5$ is alpha hydroxy and R$^4$ is hydroxy or acyloxy are obtained by incubating the C-16 unsubstituted compounds with *Streptomyces roseochromogenus* as hereinafter set forth in detail.

The compounds of the present invention having an ester group at C-17 are prepared from a 17α,21-diol derivative of the present invention as outlined below.

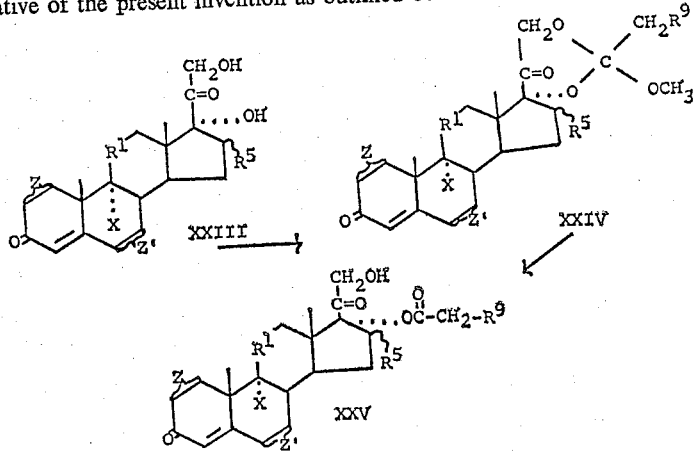

In the above formulas, X, $R^1$, $R^5$, Z and Z' are as defined hereinabove and $R^9$ is hydrogen or a lower alkyl hydrocarbon group of less than 10 carbon atoms.

In practicing the above outlined process, the 17α,21-diol XXIII is treated with a lower alkyl ortho ester, e.g. methylorthovalerate, methylorthocaproate, methylorthoacetate, and the like to obtain the ortho ester XXIV. The ortho ester upon treatment with acid, e.g. hydrochloric acid, in an aqueous organic solvent at a temperature of from room temperature to reflux temperature furnishes the 17α-acylate XXV.

The 6α-methyl derivatives of the 9α-difluoromethyl and 9α-trifluoromethyl corticoids of the present invention are obtained according to the following outlined process.

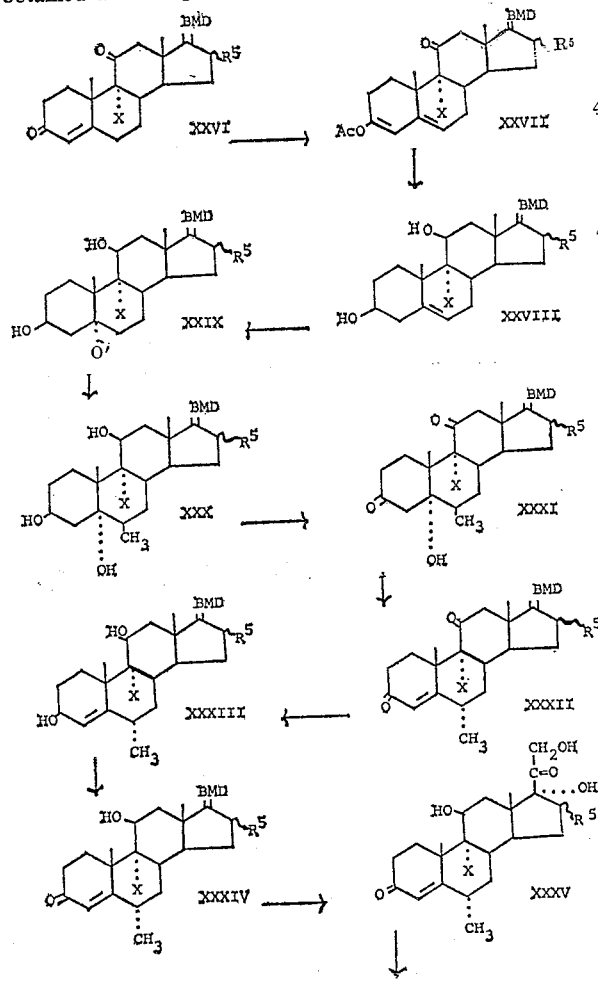

In the above formulas X, $R^5$, Ac and BMD are as defined hereinabove.

In practicing the above outlined process the starting material XXVI is converted into the enol acetate XXVII as by treatment with acetic anhydride and acetyl chloride at reflux temperatures. The enol acetate XXVII is then reduced as by treatment with sodium borohydride in aqueous organic solution as set forth in detail hereinafter to obtain the Δ⁵-3β,11β-diol steroid XXVIII which is converted into the 5α,6α-oxido steroid XXIX as by treatment with, for example, monoperphthalic acid in ether at room temperature for several hours. The steroid XXIX is then converted into the 5α-hydroxy-6-methyl steroid XXX as by treatment with methyl magnesium bromide in ether, and is then oxidized by treatment with chromium trioxide in sulfuric acid to yield the steroid XXXI. The Δ⁴-6α-methyl steroid XXXII is obtained from the 5α-hydroxy-6-methyl steroid XXXI as by treatment with an alkali hydroxide, e.g. sodium hydroxide, and organic solvents such as methanol. Reduction of the steroid XXXII as by treatment with sodium borohydride furnishes the 3β,11β-diol steroid XXXIII which is selectively oxidized as by treatment with, for example, manganese dioxide in an organic solvent to yield the steroid XXXIV. The side chain protecting group, i.e. bismethylenedioxy is removed by treatment with acid as described hereinbefore, for example, aqueous hydrofluoric acid to furnish the steroid XXXV. The steroid XXXV is then acylated as by treatment with acetic anhydride and acetic acid to furnish the corresponding 21-acylate XXXVI which is then subjected to oxidation, e.g. manganese dioxide, and the like, to obtain the 11-oxo substituted steroid XXXVII. The steroid XXXVII is then subjected to saponification as by treatment with for example potassium hydroxide in aqueous methanol to furnish the corresponding 21-hydroxy steroid XXXVIII.

The compounds prepared by the above-described process, particularly, compounds represented by Formulas XXXII through XXXVIII may be subjected to dehydrogenation at positions C-1, 2 and C-6, 7 in the manner described hereinabove to obtain the $\Delta^{1,4}$, $\Delta^{4,6}$, $\Delta^{1,4,6}$ unsaturated derivatives thereof.

The novel compounds of this invention having a 16α,17α-acetal or 16α,17α-ketal group are obtained by treatment of a 16α,17α-diol derivative of the present invention with a ketone or an aldehyde under anhydrous conditions and in the presence of a catalyst such as copper sulfate, dry hydrogen chloride, or perchloric acid without using a solvent or in the presence of a solvent inert to the reaction, such as dioxane, tetrahydrofuran, and the like. The conversion of a 16α,17α-diol derivative of the present invention into a 16α,17α-acetal or ketal may be shown as follows using for the purposes of illustration only the preparation of a 16α,17α-acetal or ketal embraced by Formula A above.

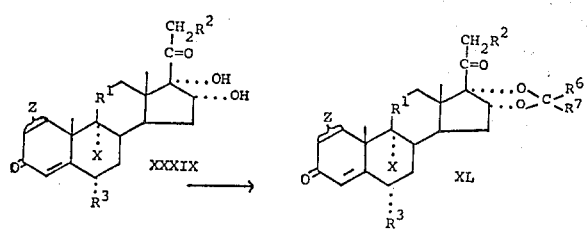

In the above formulas, $R^1$, $R^2$, $R^3$, $R^6$, $R^7$ and Z are as defined hereinabove.

The acetals and ketals of the present invention exemplified by Formula XL may be considered as 16α,17α-methylenedioxy compounds wherein the methylenedioxy group is bound with its oxygens to positions C-16α and C-17α of the steroid and wherein one or both hydrogen atoms of the methylenedioxy group may be substituted with the residue of a hydrocarbon of up to 8 carbon atoms, saturated or unsaturated, of straight or branched chain, cyclic or of a chain combining these moieties.

Compounds having a fluoro group at C-6 are obtained from a C-6 unsubstituted derivative of the present invention. A fluoro group is introduced at C-6, preferably before other derivatives are made such as the C-1,2 and C-6,7-dehydro derivatives, 16α-hydroxy, and the 16α,17α-alkylidenedioxy compounds. A process for the preparation of the 6-fluoro derivatives of this invention may be illustrated as follows.

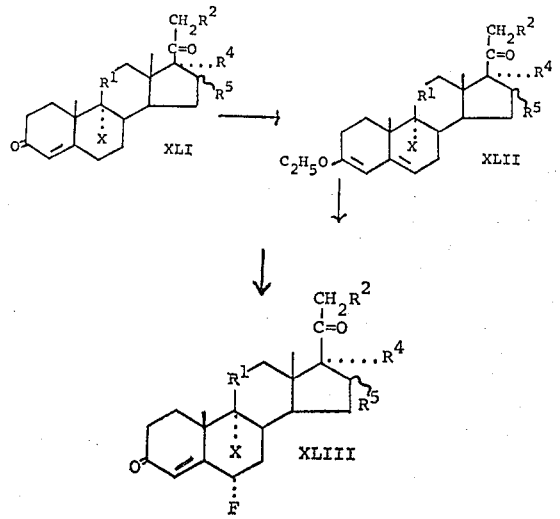

In the above formulas, $R^1$, $R^2$, $R^3$, $R^4$, $R^5$ and X are as defined hereinabove.

In practicing the above process, the 3-keto-$\Delta^4$ starting material XLI is converted into the enol ether XLII as by treatment with ethylorthoformate in the presence of an acid catalyst such as p-toluenesulfonic acid. Treatment of the enol ether with, e.g., perchloryl fluoride in an organic solvent furnishes a mixture of the 6α-fluoro and 6β-fluoro derivative which may be separated by chromatography or alternatively, the mixture of isomers may be treated with hydrogen chloride in acetic acid to furnish the 6α-fluoro compound XLIII which may then be subjected to dehydrogenation at C-1,2 and C-6,7, in the manner described hereinabove to obtain the corresponding diene and triene derivatives. Thereafter, hydroxy, ester and ether derivatives may be prepared according to the procedure described hereinabove.

The novel 9α-difluoromethyl and 9α-trifluoromethyl compounds of the present invention according to Formula C having a 6α,7α-difluoromethylene group or a 6α,7α-methylene group are obtained from a C-6,7 dehydro derivative of the present invention. These compounds may be prepared according to a process illustrated as follows.

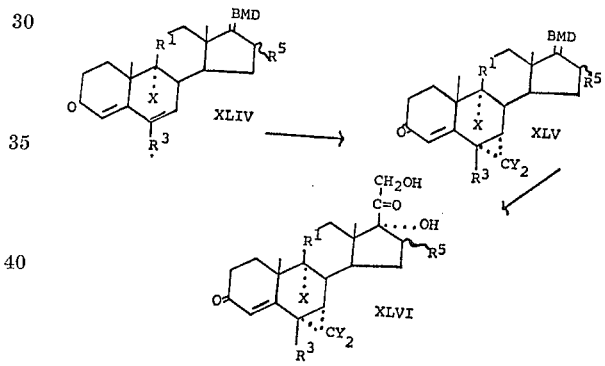

wherein $R^1$, $R^3$, $R^5$, X and Y are as defined hereinabove.

In practicing the above illustrated process, the $\Delta^{4,6}$ starting material XLIV is treated with sodium difluoroacetate in an inert solvent to furnish the 6α,7α-difluoromethylene steroid XLV (XLV; Y=fluoro). Alternatively, the reaction of steroid XLIV with dimethylsulfoxonium methylide in dimethylsulfoxide furnishes the 6α,7α-methylene steroid XLV (XLV, Y=hydrogen). The 17α, 20;20,21-bismethylenedioxy protecting group is thereafter removed by treatment with aqueous acid to furnish the steroid XLVI which may then be reduced to obtain a free hydroxy group at C-3, if desired. The steroid XLVI may also be acylated at C-21, C-17 and C-3 in accordance with the procedure described hereinabove and an ether group introduced at C-3, if desired. Steroid XLVI may also be dehydrogenated at C-1,2 to obtain the 1,2-dehydroderivative by treatment with, e.g. selenium dioxide.

The pyrazole derivatives of the novel 9α-difluoromethyl and 9α-trifluoromethyl compounds or Formulas D, E and F are prepared, at outlined below, through the treatment of a 2-hydroxymethylene-3-keto-$\Delta^4$ or $\Delta^{4,6}$ derivative of the invention with a hydrazine of the formula $NH_2NHR^8$, wherein $R^8$ represents hydrogen, phenyl, chlorophenyl, fluorophenyl, methoxyphenyl, or methylphenyl. The steroid side chain is preferably protected during this conversion as through esterification or through formation of the bismethylenedioxy protecting group.

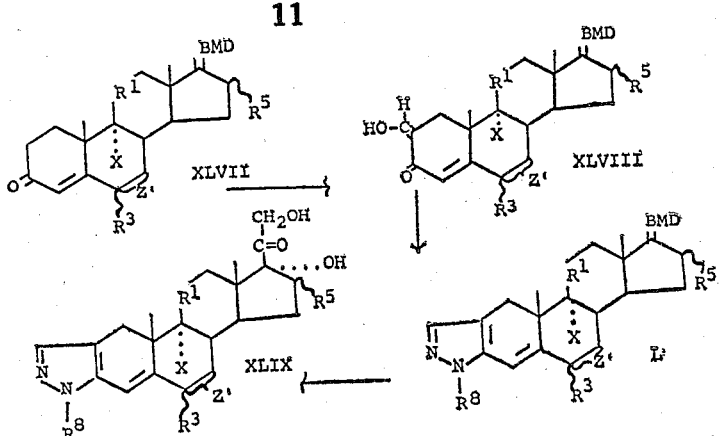

In the above formulas, $R^1$, $R^5$, $R^8$, $Z'$ and $X$ are as defined hereinabove. $R^3$ is hydrogen, methyl or fluoro, $R^3$ having alpha configuration when $Z'$ is a saturated bond.

The compounds according to Formula XLIX have anti-flammatory and other desirable corticoid activity. They may be acylated at C–21 and/or C–17, if desired, via the procedure described hereinabove.

In lieu of using a $\Delta^4$-ene or a $\Delta^{4,6}$-diene starting material illustrated by Formula XLVII, a 3-keto-$\Delta^4$-6α,7α-difluoromethylene or 6α,7α-methylene derivative can be used in the above described process to obtain the pyrazole compounds of Formula F.

The novel 9α-trifluoromethyl- and 9α-difluoromethyl compounds of the present invention wherein $R^4$ is hydrogen are prepared from the corresponding 9α-triflorometh- yl-17α-acyloxy and 9α-difluoromethyl-17α-acyloxy compounds of this invention, preferably acetoxy, by treatment with chromous chloride or zinc in acetic acid as described in detail hereinafter. The reaction can be illustrated as follows.

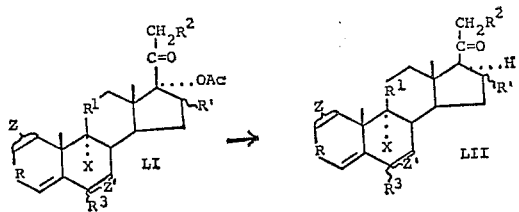

In the above formulas, R, $R^1$, $R^2$, $R^3$, $R'$, Z and $Z'$ as defined hereinabove.

The above compounds represented by Formula LII can be converted into the 9α-trifluoromethyl- and 9α-difluoromethylpyrazoles by the procedure described hereinabove. These compounds can also be transformed into the 6α,7α-difluoromethylene and 6α,7α-methylene derivatives by the procedure described hereinabove. In the foregoing transformation, and for the preparation of other derivatives of the present invention as described hereinabove, the side chain can be protected by ketalization as for example, by refluxing with an alkylene glycol preferably ethylene glycol, in benzene in the presence of para-toluenesulfonic acid for a period of time of the order of about 12 hours or more. The side chain protecting group can thereafter be removed by treatment with acid in an organic solvent, e.g. para-toluenesulfonic acid in acetone and the like.

The following examples serve to illustrate but are not intended to limit the scope of the present invention.

PREPARATION A

One gram of 3α,17α,21-trihydroxy-5β-pregnane-11,20- dione-21-acetate is allowed to stand at room temperature in a nitrogen atmosphere for 5 hours with 1 g. of potassium bicarbonate in 10 ml. of water and 90 ml. of methanol. At the end of this time the reaction mixture is neutralized with acetic acid, the methanol is evaporated under reduced pressure and the residue is extracted with ethyl acetate and water. Evaporation of the ethyl acetate from these extracts yields 3α,17α,21-trihydroxy-5β-pregnane 11,20-dione which is collected by filtration and recrystallized from acetone:hexane.

To a solution of 5 g. of the above 3α,17α,21-trihydroxy compound in 200 ml. of chloroform are added 40 ml. of 37% aqueous formaldehyde and 5 ml. of concentrated hydrochloric acid. The mixture is stirred for 48 hours at room temperature and the two layers then separated. The aqueous layer is extracted with chloroform and the combined organic layer and chloroform extracts are washed with water to neutrality, dried over sodium sulfate and evaporated to dryness to yield 17α,20;20,21-bismethylenedioxy-3α-hydroxy-5β-pregnan-11-one which is recrystallized from methanol:ether.

A mixture of 1 g. of the above 17α,20;20,21-bismethyl- enedioxy-3α-hydroxy compound, 4 ml. of pyridine and 2 ml. of acetic anhydride is allowed to stand at room temperature for 15 hours. The mixture is then poured into ice water and the solid which forms is collected by filtration, washed with water and dried to yield 17α,20; 20,21 - bismethylenedioxy - 3α - acetoxy - 5β - pregnan- 11-one which may be further purified through recrystallization from acetone:hexane.

To a stirred solution of 1 gram of 17α,20;20,21- bismethylenedioxy - 3α - acetoxy - 5β - pregnan - 11- one in 40 ml. of dioxane is added in a dropwise fashion a solution containing 1.2 molar equivalents of bromine in dioxane at a temperature of about 15° C. A few drops of anhydrous hydrobromic acid solution in chloroform are then added and the mixture is allowed to stand at room temperature for about 30 minutes. Then, the mixture is poured into 5% aqueous sodium bicarbonate solution and extracted with chloroform. The chloroform extracts are washed with water, dried and evaporated under reduced pressure to yield 17α,20;20,21-bismethyl- enedioxy-3α-acetoxy-9α-bromo-5β-pregnan-11-one which is further purified through recrystallization from methylene chloride:hexane.

To a mixture of 2 g. of the above 9α-bromo compound, 30 ml. of anhydrous tetrahydrofuran, and 50 ml. of anhydrous liquid ammonia, there is slowly added 3 molar equivalents of metallic lithium based on the steroid starting material with stirring and while maintaining the temperature at about −35° to −40° C. After the addition of lithium is completed, the mixture is stirred for about 30 minutes and then 3 molar equivalents of acetyl chloride and tetrahydrofuran is slowly added. The reaction mixture is then left standing for about ½ hour after the addition of acetyl chloride is completed. Thereafter, the liquid ammonia is allowed to evaporate and the reaction mixture is then diluted with methylene chloride, poured into water and separated. The organic phase is washed with water, dried and evaporated to dryness to yield 17α, 20;20,21-bismethylenedioxy-3α,11 - diacetoxy - 5β-pregn-9 (11)-ene which may be purified by chromatography or fractional crystallization from acetone:hexane.

Example 1

To a gently refluxing and stirred solution of 1 gram of 17α,20;20,21 - bismethylenedioxy - 3α,11 - diacetoxy - 5β-pregn-9(11)-ene in 8 ml. of dimethyl diethylene glycol ether, there is added in a dropwise fashion over a two hour period a solution of 30 equivalents of sodium chlorodifluoroacetate in 30 ml. of dimethyl diethylene glycol ether. Refluxing is continued until the reaction is complete, as indicated by the U.V. spectra, and the mixture is then filtered. The filtrate is then evaporated to dryness under reduced pressure and the residue chromatographed with methylene chloride on alumina to yield 17α,20;20,21-bismethylenedioxy-3α,11β - diacetoxy - 9α,11α - difluoromethylene-5β-pregnane.

By repeating the above process using as the starting material, the corresponding 16α-methyl and 16β-methyl compounds of 17α,20;20,21-bismethylenedioxy - 3α,11 - diacetoxy-5β-pregn-9(11)-ene, there are obtained the corresponding 16α-methyl and 16β-methyl derivatives of 17α, 20;20,21-bismethylenedioxy - 3α,11β-diacetoxy-9α,11α-difluoromethylene-5β-pregnane.

Example 2

A solution of 1 g. of 17α,20;20,21-bismethylenedioxy-3α,11β-diacetoxy-9α,11α-difluoromethylene - 5β-pregnane in 50 ml. of methanol is heated at reflux for 3 hours with a solution of .2 g. of potassium hydroxide in 1 ml. of water. The reaction mixture is then poured into ice water and the solid which forms collected by filtration, washed with water to neutrality and dried to yield 17α,20;20,21-bismethylenedioxy-3α-hydroxy - 9α - difluoromethyl - 5β-pregnan-11-one which is recrystallized from methylene chloride:ether.

A solution of 6 g. of 17α,20;20,21-bismethylenedioxy-3α-hydroxy-9α-difluoromethyl-5β-pregnan - 11-one in 120 ml. of pyridine is added to a mixture of 6 g. of chromium trioxide in 20 ml. of pyridine. The reaction mixture is allowed to stand at room temperature for 15 hours, diluted with ethyl acetate and filtered through Celite diatomaceous earth. The filtrate is washed well with water, dried and evaporated to dryness to yield 17α,20;20,21-bismethylenedioxy-9α-difluoromethyl - 5β - pregnane-3,11-dione which may be further purified by recrystallization from acetone:hexane.

To a stirred solution of 1 g. of the thus-obtained 3,11-dione in 17 ml. of chloroform and 20 ml. of glacial acetic acid, cooled to −10° C. are added a few drops of a 15% solution of hydrogen bromide in acetic acid followed by a solution of 0.46 g. of bromine in 12 ml. of chloroform, the latter at such a rate that the reaction mixture maintains a pale yellow color. A cold solution of 2.5 g. of sodium acetate in 17 ml. of water is then added. The layers are separated and the aqueous layer is extracted with chloroform. The combined extracts and organic layer are washed with water, dilute potassium bicarbonate solution and with water, dried over sodium sulfate and evaporated to dryness to yield the 4-bromo intermediate, 1 g. of which is dissolved in 20 ml. of dimethylformamide containing 0.5 g. of lithium chloride. This solution is stirred under nitrogen at steam bath temperatures for four hours. After cooling to 10° C., 11 ml. of water are added with stirring at such a rate that the temperature is maintained below 30° C. Stirring in an ice bath is continued until solid forms and this material is then collected by filtration, washed with cold 1:1 water:dimethylformamide and then water and dried to yield 17α,20; 20,21-bismethylenedioxy-9α-difluoromethylpregn-4-ene-3,11-dione which is further purified through recrystallization from acetone with charcoal decolorization as necessary.

One gram of the thus-obtained compound in 100 ml. of 80% acetic acid is held under nitrogen for 7 hours at 90°. The mixture is then concentrated under vacuum to a small volume and poured into water. The solid which forms is collected by filtration washed well with water, dried and recrystallized from acetone:hexane to yield 9α-difluoromethyl-17α,21-dihydroxypregn - 4-ene-3,11,20-trione.

By using the 16α-methyl and 16β-methyl substituted compounds obtained by the method of Example 1 as the starting material in the process of this example, there are obtained 9α-difluoromethyl-16α-methyl-17α,21-dihydroxypregn-4-ene - 3,11,20 - trione and 9α - difluoromethyl-16β-methyl-17α,21-dihydroxypregn-4-ene - 3,11,20 - trione, respectively.

Example 3

A mixture of 5 g. of 17α,20;20,21-bismethylenedioxy-3α,11-diacetoxy-5β-pregn-9(11)-ene, 2.5 ml. of anhydrous pyridine and 10 ml. of trifluoroiodomethane is irradiated with ultra-violet light from a high-pressure quartz-mercury lamp (Philips Type 93110 E) at a distance of 4 cm. during 72 hrs. in a sealed and cooled quartz tube. Thereafter the trifluoroiodomethane is distilled off and the residue is treated with 75 ml. of ether. The precipitate thereby formed is filtered off, and the filtrate is washed with 2×10 ml. of 1-N hydrochloric acid, thereafter with a saturated solution of NaHCO₃ and subsequently with water. After drying over MgSO₄, a few drops of pyridine are added and thereafter the solution is evaporated to dryness. The residue is recrystallized from methanol containing 0.5% pyridine to yield 17α,20;20,21-bismethylenedioxy-3α-acetoxy-9α-trifluoromethyl-5β-pregnan-11-one.

Similarly, by using the corresponding 16α-methyl or 16β-methyl derivative of 17α,20;20,21-bismethylenedioxy-3α,11-diacetoxy-5β-pregn-9(11)-ene as the starting material in the process of this example, there is obtained 17α, 20;20,21-bismethylenedioxy - 9α - trifluoromethyl - 16α-methyl-3α-acetoxy-5β - pregnan-11-one and 17α,20;20,21-bismethylenedioxy-9α-trifluoromethyl - 16β - methyl-3α-acetoxy-5β-pregnan-11-one.

Example 4

The method of Example 2 is repeated with the exception of using 17α,20;20,20-bismethylenedioxy-3α-acetoxy-9α-trifluoromethyl-5β-pregnan-11-one in lieu of 17α,20; 20,21-bismethylenedioxy - 3α,11β - diacetoxy - 9α,11α-difluoromethylene-5β-pregnane as the starting material to furnish 9α-trifluoromethyl-17α,21-dihydroxypregn-4-ene-3,11,20-trione.

Likewise, by using the 16α-methyl and 16β-methyl compounds prepared in Example 3, there is obtained 9α-trifluoromethyl-16α-methyl-17α,21-dihydroxypregn - 4 - ene-3,11,20-trione and 9α-trifluoromethyl-16β-methyl-17α,21-dihydroxypregn-4-ene-3,11,20-trione.

Example 5

A mixture of 0.5 g. of 9α-trifluoromethyl-17α,21-dihydroxypregn-4-ene-3,11,20-trione, 10 ml. of dioxane and 0.35 g. of 2,3-dichloro-5,6-dicyano-1,4-benzoquinone is refluxed for 10 hours. The mixture is then cooled, filtered and evaporated to dryness. The residue is dissolved in acetone and this solution is then filtered through 10 g. of alumina and concentrated to yield 9α-trifluoromethyl-17α,21-dihydroxypregna-1,4-diene-3,11,20-trione which is further purified by recrystallization from acetone:hexane.

By repeating the process of this example using as the starting material the 9α-trifluoromethyl and 9α-difluoromethyl compounds of this invention obtained in Examples 2 and 4, there are obtained 9α-trifluoromethyl-16α-methyl-17α,21-dihydroxypregna-1,4-diene-3,11,20-trione, 9α - trifluoromethyl-16β-methyl - 17α,21 - dihydroxypregna-1,4-diene-3,11,20-trione, 9α-difluoromethyl-17α,21-dihydroxypregna-1,4-diene-3,11,20-trione, 9α-difluoromethyl - 16α-methyl-17α,21-dihydroxypregna-1,4-diene-3,11,20 - trione, and 9α-difluoromethyl-16β-methyl-17α,21-dihydroxypregna-1,4-diene-3,11,20-trione.

Example 6

One gram of 9α-trifluoromethyl-17α,21-dihydroxypregn-4-ene-3,11,20-trione and 2 g. of chloranil in 40 ml. of t-butanol are heated at reflux for 8 hours. The cooled reaction mixture is filtered and the solid thus separated is washed with a large volume of ethyl acetate. The combined filtrate and washings are dried over sodium sulfate and evaporated to dryness to yield 9α-trifluoromethyl-17α,21-dihydroxypregna-4,6-diene-3,11,20-trione which may be further purified by chromatography over silica or recrystallization from methylene chloride:ether.

Similarly, by repeating the process of this example using the other 9α-trifluoromethyl and 9α-difluoromethyl compounds of the present invention prepared by Examples 2 and 4, the corresponding Δ⁴,⁶-diene derivatives are obtained, e.g. 9α-difluoromethyl-17α,21-dihydroxypregna-4,6-diene-3,11,20-trione, 9α-trifluoromethyl - 16α - methyl-17α,21-dihydroxypregna-4,6-diene-3,11,20-trione, etc.

Example 7

By repeating the process of Example 5 using as the starting material the Δ⁴,⁶ compounds obtained in Example 6, the corresponding Δ¹,⁴,⁶-triene compounds are obtained, e.g. 9α-trifluoroethyl-17α,21-dihydroxypregna-1,4,6-triene-3,11,20-trione, 9α-trifluoromethyl-16α-methyl - 17α,21-dihydroxypregna-1,4,6-triene - 3,11,20 - trione, 9α-difluoromethyl-17α,21-dihydroxypregna - 1,4,6-triene-3,11,20-trione, 9α-difluoromethyl-16β-methyl-17α,21-dihydroxypregna-1,4,6-triene-3,11,20-trione, etc.

Example 8

A mixture of 1 g. of 9α-trifluoromethyl-17α,21-dihydroxypregna-4,6-diene-3,11,20-trione, 2 g. of chloranil and 10 ml. of n-amyl alcohol are refluxed under nitrogen for 24 hours. The mixture is then cooled, washed with a cold aqueous solution of 10% sodium hydroxide until the washings are colorless, dried over sodium sulfate and evaporated. Chromatography of the residue on neutral alumina yields 9α-trifluoromethyl-17α,21-dihydroxypregna - 1,4,6-triene-3,11,20-trione which may be further purified through recrystallization from acetone:hexane.

Example 9

To a solution of 5 g. of 9α-trifluoromethyl-17α,21-dihydroxypregn-4-ene-3,11,20-trione in 200 ml. of chloroform are added 40 ml. of 37% aqueous formaldehyde and 5 ml. of concentrated hydrochloric acid. The mixture is stirred for 48 hours at room temperature and the two layers then separated. The aqueous layer is extracted with chloroform and the combined organic layer and chloroform extracts are washed with water to neutrality, dried over sodium sulfate and evaporated to dryness to yield 17α,20;20,21 - bismethylenedioxy-9α-trifluoromethylpregn-4-ene-3,11-dione which is recrystallized from methanol:ether.

By repeating the process of this example using the 17α,21-diol-20-keto derivatives prepared in Examples 2, 4, 5, 6 and 7 above as the starting material, there is obtained the corresponding 17α,20;20,21-bismethylenedioxy derivative, e.g. 17α,20;20,21-bismethylenedioxy-9α-trifluoromethylpregna-4,6-diene-3,11-dione, 17α,20;20,21-bismethylenedioxy-9α-trifluoromethylpregna-1,4 - diene - 3,11-dione, 17α,20;20,21-bismethylenedioxy-9α-trifluoromethylpregna-1,4,6-triene-3,11-dione, 17α,20;20,21 - bismethylenedioxy-9α-trifluoromethyl-16α-methylpregn-4 - ene-3,11-dione, 17α,20;20,21-bismethylenedioxy-9α-difluoromethylpregn-4-ene-3,11-dione, etc.

Example 10

A solution of 1 g. of sodium borohydride in 3 ml. of water is added to an ice-cooled solution of 1 g. of 17α,20;20,21-bismethylenedioxy-9α-trifluoromethylpregn - 4 - en-3,11-dione in 120 ml. of methanol and the mixture then allowed to stand for 16 hours at room temperature. The excess reagent is decomposed by addition of acetic acid and the solution is then concentrated to small volume in vacuo and diluted with water. The product is extracted with ethyl acetate and these extracts are washed with water, dried and evaporated to yield 17α,20;20,21-bismethylenedioxy-9α-trifluoromethylpregn - 4-ene - 3β,11β-diol which may be further purified by recrystallization from acetone:hexane.

A mixture of 1 g. of the above 3β,11β-diol in 20 ml. of dioxane, and 1.1 molar equivalents of 2,3-dichloro-5,6-dicyano-1,4-benzoquinone is allowed to stand at room temperature for 3 hours. The solid formed during the reaction is removed by filtration and the filtrate evaporated to dryness. The residue is dissolved in acetone and filtered through 20 g. of alumina to yield 17α,20;20,21-bismethylenedioxy-9α-trifluoromethyl-11β-hydroxypregn - 4 - en-3-one which may be further purified by recrystallization from acetone:hexane.

A suspension of 1 g. of the thus-obtained Δ⁴-3-oxo compound in 10 ml. of 48% aqueous hydrofluoric acid is stirred at 0° C. for 90 minutes. At the end of this time, the reaction mixture is neutralized with 5% aqueous potassium bicarbonate solution and extracted with ethyl acetate. These extracts are evaporated to dryness under reduced pressure and chromatographed on silica gel with 2:1 hexane:ethyl acetate to yield 9α-trifluoromethyl-11β,17α,21 - trihydroxypregn - 4 - ene - 3,20 - dione (9α-trifluoromethylhydrocortisone) which may be further purified through recrystallization from isopropanol.

Similarly, by using the other 9α-trifluoromethyl and 9α-difluoromethyl-3,11-dione derivatives of this invention as the starting material in the process of this example, the corresponding 9α-trifluoromethyl- and 9α-difluoromethyl-hydrocortisones and prednisolones are obtained, e.g. 9α-trifluoromethyl - 11β,17α,21 - trihydroxypregna-1,4-diene-3,20-dione, 9α-trifluoromethyl-11β,17α,21-trihydroxy-16β-methylpregna - 1,4 - diene - 3,20 - dione, 9α - trifluoromethyl 11β,17α,21 - trihydroxy - 16α - methylpregna - 1, 4-diene-3,20-dione, 9α-difluoromethyl-11β,17α,21-trihydroxypregn-4-ene-3,20-dione, etc.

Example 11

A mixture of 1 g. of 9α-trifluoromethyl-11β,17α,21-trihydroxypregn-4-en-3-one, 4 ml. of pyridine and 2 ml. of acetic anhydride is allowed to stand at room temperature for 15 hours. The mixture is then poured into ice water and the solid which forms is collected by filtration, washed with water and dried to yield 9α-trifluoromethyl-11β,17α,21-trihydroxypregn-4-ene-3,20-dione - 21 - acetate which may be further purified through recrystallization from acetone:hexane.

A solution of 1 g. of the above prepared 21-acetate in 50 ml. of tetrahydrofuran is added over a 30 minute period to a stirred suspension of 1 g. of lithium tri-t-butoxy aluminum hydride in 50 ml. of anhydrous tetrahydrofuran and this mixture is left standing at room temperature for 5 hours. To the mixture are cautiously added 5 ml. of ethyl acetate and 2 ml. of water. Sodium sulfate is next added, the mixture is filtered and the solid thus collected is washed with hot ethyl acetate. The combined organic solutions are then evaporated to yield 9α-trifluoromethylpregn - 4 - en - 20 - one - 3β,11β,17α,21-tetrol-21-acetate which may be further purified through recrystallization from acetone:hexane.

Similarly, by using other carboxylic acid anhydrides in place of acetic anhydride in the process of this example, other 21-acylates are obtained, e.g. 21-propionate.

Likewise, through the use of other 9α-trifluoromethyl and difluoromethyl corticoids of this invention prepared as described in Example 10, the corresponding 3β,11β,17α,21-tetrahydroxy-21-acylates are obtained, e.g. 9α-trifluoromethyl - 16β - methyl - 3β,11β,17α,21 - tetrahydroxypregna - 1,4 - dien - 20 - one - 21 - acetate, 9α - trifluoromethyl - 3β,11β,17α,21 - tetrahydroxypregna - 4, 6 - dien - 20 - one - 21 - acetate, etc.

Example 12

A solution of 1 g. of 9α-trifluoromethyl-3β,11β,17α, 21-tetrahydroxypregn-4-en-20-one-21-acetate in 50 ml. of methanol is heated at reflux for 3 hours with a solution of .2 g. of potassium hydroxide in 1 ml. of water. The reaction mixture is then poured into ice water and the solid which forms collected by filtration, washed with water to neutrality and dried to yield 9α-trifluoromethyl-3β,11β,17α,21 - tetrahydroxypregn - 4 - en - 20 - one which is recrystallized from methylene chloride:ether.

Similarly, by use of the process of this example, the other 21-acylates of this invention are hydrolyzed to the corresponding free 21-hydroxy derivative.

Example 13

A mixture of 1 g. of 9α-trifluoromethyl-3β,11β,17α,21-tetrahydroxypregn-4-en-20-one-21-acetate, 4 ml. of pyridine and 2 ml. of acetic anhydride is allowed to stand at room temperature for 15 hours. The mixture is then poured into ice water and the solid which forms is collected by filtration, washed with water and dried to yield 9α - trifluoromethyl - 3β,11β,17α,21 - tetrahydroxypregn-4-en-20-one-3,21-diacetate which may be further purified through recrystallization from acetone:hexane.

In a similar manner, the 3,21-diacylate of other 9α-trifluoromethyl and 9α-difluoromethyl compounds of the present invention are obtained.

Example 14

A solution of 6 g. of 9α-trifluoromethylpregn-4-en-20-one - 3β,11β,17α,21 - tetrol - 3,21 - diacetate in 120 ml. of pyridine is added to a mixture of 6 g. of chromium trioxide in 20 ml. of pyridine. The reaction mixture is allowed to stand at room temperature for 15 hours, diluted with ethyl acetate and filtered through Celite diatomaceous earth. The filtrate is washed well with water, dried and evaporated to dryness to yield 9α-trifluoromethyl-3β,17α,21 - trihydroxypregn - 4 - ene - 11,20 - dione - 3,21-diacetate which may be further purified by recrystallization from acetone:hexane.

Example 15

A solution of 1 g. of 9α-trifluoromethyl-3β,17α,21-trihydroxypregn - 4 - en - 11,20 - dione - 3,21 - diacetate in 50 ml. of methanol is left standing for 3 hours at 0° C. with a solution of 0.25 g. of potassium hydroxide in 1 ml. of water. The reaction mixture is then poured into ice water and the solid which forms collected by filtration, washed with water to neutrality and dried to yield 9α-trifluoromethyl - 3β,17α,21 - trihydroxypregn - 4 - en - 11,20-dione which is recrystallized from methylene chloride:ether.

Example 16

Two milliliters of dihydropyran are added to a solution of 1 g. of 9α-trifluoromethyl-3β,11β,17α-21-tetrahydroxypregn-4-en-20-one-21-acetate in 15 ml. of benzene. About 1 ml. is removed by distillation to remove moisture and 0.4 g. of p-toluenesulfonyl chloride is added to the cooled solution. This mixture is allowed to stand at room temperature for four days, and is then washed with aqueous sodium carbonate solution and water, dried and evaporated. The residue is chromatographed on neutral alumina, eluting with hexane, to yield 3β-(tetrahydropyran-2'-yloxy) - 9α - trifluoromethyl - 11β,17α,21 - trihydroxypregn-4-en-20-one-21-acetate which is recrystallized from pentane.

Similarly, by using the other 9α-trifluoromethyl- and 9α-difluoromethyl compounds of the present invention having a free 3β-hydroxy group, the corresponding 3β-tetrahydropyran-2-yl ethers are obtained.

Likewise, by the use of dihydrofuran in the process of this example in lieu of dihydropyran, the corresponding 3β-tetrahydrofuran-2-yl ether is obtained, e.g. 3β-(tetrahydrofuran-2'-yloxy)-9α-trifluoromethyl-11β,17α,21 - trihydroxypregn-4-en-20-one-21-acetate.

Example 17

By repeating the process of Example 12 using the 3β-tetrahydropyran-2-yl ethers and 3β-tetrahydrofuran-2-yl ethers of Example 16 as the starting material, there is obtained the corresponding free 21-hydroxy compound, e.g. 3β-(tetrahydropyran-2'-yloxy)-9α - trifluoromethyl-11β,17α,21-trihydroxypregn-4-en-20-one.

Example 18

By subjecting 3β-(tetrahydropyran-2'-yloxy) - 9α - trifluoromethyl-11β,17α,21-trihydroxypregn - 4 - en-20-one-21-acetate to the procedure of Example 14, there is obtained 3β-(tetrahydropyran-2'-yloxy)-9α - trifluoromethyl-17α,21-dihydroxypregn-4-ene-11,20-dione-21-acetate.

Upon treatment of this compound with potassium hydroxide in aqueous methanol as described in Example 12, there is obtained the corresponding free 21-hydroxy compound.

The other 3-ethers of the present invention may be subjected to the procedure of this example to obtain similar compounds, e.g. 3-β-(tetrahydrofuran - 2' - yloxy)-9α-trifluoromethyl-17α,21 - dihydroxypregn - 4 - ene - 11,20-dione-21-acetate and the corresponding free 21-hydroxy compound.

Example 19

One gram of 9α-trifluoromethyl - 3β,11β,17α,21 - tetrahydroxypregn-4-en-20-one - 3,21 - diacetate is allowed to stand at room temperature for 15 hours with 0.25 g. of potassium bicarbonate in 10 ml. of water and 90 ml. of methanol. At the end of this time, the methanol is evaporated under reduced pressure and the residue is extracted with ethyl acetate and water. Evaporation of the ethyl acetate from these extracts yields 9α-trifluoromethyl-3β,11β,17α,21-tetrahydroxypregn-4-en-20-one - 3 - acetate which is collected by filtration and recrystallized from acetone:hexane.

By subjecting the other 3β,21-diacylates of the present invention to the process of this example, the corresponding free 21-hydroxy compounds are obtained, e.g. 9α-trifluoromethyl-3β, 17α,21 - trihydroxypregn - 4 - ene-11,20-dione-3-acetate, 9α-trifluoromethyl - 16α - methyl-3β,17α,21-trihydroxypregn - 4 - ene - 11,20 - dione - 3-acetate, 9α-difluoromethyl-3β,17α,21 - trihydroxypregna-4,6-diene-11,20-dione - 3 - acetate, 9α - trifluoromethyl-3β,11β,17α,21-tetrahydroxypregna - 1,4 - dien - 20 - one-3-acetate, etc.

Example 20

A mixture of 1 g. of 9α-trifluoromethyl-3β,17α,21-trihydroxypregn-4-ene-11,20-dione, 4 ml. of pyridine and 1.1 molar equivalents of acetic anhydride is allowed to stand at room temperature for 15 hours. The mixture is then poured into ice water and the solid which forms is collected by filtration, washed with water and dried to yield 9α-trifluoromethyl - 3β,17α,21 - trihydroxypregn-4-ene-11,20-dione-21-acetate which may be further purified through recrystallization from acetone: hexane.

Similarly, by the above procedure, other 21-esters of the 9α-trifluoromethyl and 9α-difluoromethyl compounds of this invention may be prepared.

Example 21

5 milliliters of dihydropyran are added to a solution of 1 g. of 9α-trifluoromethyl-3β,17α,21-trihydroxypregn-4-ene-11,20-dione in 20 ml. of benzene. About 1 ml. is removed by distillation to remove moisture and 0.5 g. of p-toluenesulfonyl chloride is added to the cooled solution. This mixture is allowed to stand at room temperature for four days and is then washed with aqueous sodium carbonate solution and water, dried and evaporated. The residue is chromatographed on neutral alumina, eluting with hexane, to yield 3β,21 - bis(tetrahydropyran-2' - yloxy) - 9α - trifluoromethyl - 17α - hydroxypregn - 4 - ene-11,20-dione which is recrystallized from pentane.

Other bis ethers may be prepared by the above procedure from other 3β,21-diol compounds of the present invention, e.g. 3β,21-bis(tetrahydropyran-2'-yloxy)-9α-trifluoromethyl-11β,17α-dihydroxypregn - 4 - en - 20 - one. etc. Similarly, by using dihydrofuran in place of dihydropyran in the above procedure, the bis-tetrahydrofuranyl ethers are obtained.

Example 22

A mixture of 2.0 g. of 9α-trifluoromethyl-17α,21-dihydroxypregn-4-ene-3,11,20-trione, 4 ml. of methylorthovalerate, 4.0 ml. of dry dimethylformamide, and 20 mg. of p-toluenesulfonic acid is stirred and refluxed for 20 minutes. The mixture is then cooled to about room temperature, about three drops of pyridine are added and then the mixture concentrated to dryness under reduced pressure. The residue is then treated with methanol from which the 17,21-orthoester crystalizes.

A mixture of about 1.5 g. of the above 17,21-orthoester, 120 ml. of methanol, 10 ml. of water and 3 ml. of 1 N-hydrochloric acid is stirred and refluxed for 20 minutes. The resulting mixture is then filtered and evaporated to dryness. The residue is purified from methanol to yield 9α - trifluoromethyl - 17α,21 - dihydroxypregn - 4 - ene-3,11,20-trione-17-valerate.

By use of the process of this example, other 17α-acylate derivatives of the 9α-trifluoromethyl and 9α-difluoromethyl compounds of the present invention are obtained. Thus, using 9α-trifluoromethyl-prednisolone, 9α-trifluoromethyl-prednisone, 9α-trifluoromethyl-16β-methyl-prednisolone, 9α-difluoromethyl-cortisone, respectively, as the starting material, the corresponding 17α-valerate is obtained.

Likewise, by the use of methylorthoacetate, and the like in place of methylorthovalerate in the process of this example, the corresponding 17α-acylate, e.g. 17α-acetate is obtained, for example, 9α-trifluoromethyl-cortisone-17-acetate, 9α-trifluoromethyl-prednisolone - 17 -acetate, 9α-trifluoromethyl - hydrocortisone - 17 -acetate, 9α - difluoromethyl-cortisone-17-acetate, 9α - trifluoro-16β - methyl-prednisolone-17-acetate, etc.

Example 23

A solution of 5 g. of 9α-trifluoromethyl-17α,20;20,21-bismethylenedioxypregn-4-ene - 3,11 - dione in 50 ml. of aceticanhydride and 50 ml. of acetyl chloride is heated at reflux for 4 hours under nitrogen. The reaction mixture is then distilled to almost dryness, cooled, and diluted with ether. The organic phase is washed with water, aqueous 5% sodium bicarbonate solution and again with water, dried over sodium sulfate and evaporated to yield 9α-trifluoromethyl-17α,20;20,21 - bismethylenedioxy-3-acetoxypregna-3,5-dien-11-one which may be recrystallized from acetone:hexane.

A solution of 6 g. of the above enol acetate in 100 ml. of 95% ethanol and 35 ml. of tetrahydrofuran is cooled to 10° C. and added dropwise over a 1 hour period to a stirred, cooled solution of 6 g. of sodium borohydride in 50 ml. of 80% ethanol, the reaction temperature being maintained below 5° C. Upon completion of addition, the solution is allowed to stand at 0° C. to 5° C. for 2 hours. Two hundred milliliters of 10% sodium hydroxide solution are then added and the solution heated at the boiling point for 15 minutes. The solvent is evaporated under reduced pressure and the residue is acidified with 20% hydrochloric acid. The solid which forms is collected by filtration, washed with water and dried to yield 9α-trifluoromethyl-17α,20; 20,21-bismethylenedioxypregn-5-ene-3β,11β-diol which may be further purified by recrystallization from acetone.

A solution of 2.5 g. of the above Δ5 compound in 100 ml. of chloroform is cooled to 0° C. and mixed with a solution of 1.1 molar equivalents of monoperphthalic acid in ether. The mixture is allowed to stand at room temperature for 20 hours and then diluted with water. The organic layer is separated, washed with aqueous sodium bicarbonate solution and then with water to neutrality, dried over sodium sulfate and evaporated to dryness to yield 9α-trifluoromethyl-17α,20; 20,21-bismethylenedioxy-5α,6α-oxido-pregnane-3β,11β-diol which may be further purified by recrystallization from acetone:hexane.

To a stirred solution of 20 ml. of 4 N methylmagnesium bromide in ether is added a solution of 1 g. of the above 5α,6α-oxido compound in 30 ml. of dry tetrahydrofuran and the stirred mixture is heated at reflux temperatures for 30 minutes. The reflux condenser is then replaced by a calcium chloride drying tube and the ether is allowed to escape. When the internal temperature is 54° C., the condenser is returned and the mixture refluxed for an additional 4-hour period. Two hundred milliliters of a saturated ammonium chloride solution are then slowly added to the cooled mixture which is then stirred for 15 minutes and extracted with ethylacetate. These extracts are washed with water, dried over sodium sulfate and evaporated to dryness to yield 6β-methyl-9α-trifluoromethyl-17α, 20; 20, 21-bismethylenedioxypregnane-3β,5α,11β-triol which is recrystallized from aqueous methanol.

To a stirred solution of 1 g. of the thus-obtained compound in 10 ml. of acetone, cooled to 0° C., is added under nitrogen a solution of 8 N chromic acid (prepared by mixing 26 g. of chromium trioxide with 23 ml. of concentrated sulfuric acid and diluting with water to 100 ml.) until the color of the reagent persists in the mixture. The mixture is then stirred for 5 minutes at 0–5° C. and diluted with water. The solid which forms is collected by filtration, washed with water and dried under vacuum to yield 6β - methyl - 9α - trifluoromethyl - 17α,20; 20,21-bismethylenedioxy - 5α - hydroxy-pregnane-3,11-dione which may be further purified by recrystallization from acetone: hexane.

A solution of 1 g. of the above 6β-methyl-3,11-dione in 20 ml. of methanol containing 0.2 g. of sodium hydroxide is allowed to stand for 1½ hours at room temperature. The mixture is then poured into water and extracted with methylene chloride. These extracts are then evaporated to yield 6α-methyl-9α-trifluoromethyl-17α,20; 20,21 - bismethylenedioxypregn - 4 - ene-3,11-dione which may be recrystallized from acetone:hexane.

By subjecting 6α - methyl - 9α - trifluoromethyl-17α,20; 20,21-bismethylenedioxypregn-4-ene-3,11-dione to reduction with sodium borohydride followed by selective oxidation at C–3 and then removing the bismethylenedioxy protecting group in accordance with the procedure of Example 10, there is obtained 6α-methyl-9α-trifluoromethyl-11β,17α,21-trihydroxypregn-4-ene-3,20-dione.

By repeating the process of this example using as the starting material the 17α,20; 20,21-bismethylenedioxy derivative of 9α-trifluoromethyl-16α-methylpregn-4-ene-3,11 - dione, 9α - trifluoromethyl-16β-methylpregn-4-ene-3,11 - dione, 9α - difluoromethylpregn - 4 - ene-3,11-dione, there is obtained 6α,16α-dimethyl-9α-trifluoromethylhydrocortisone, 6α,16β - dimethyl - 9α-trifluoromethylhydrocortisone, 6α-methyl-9α-difluoromethylhydrocortisone, respectively.

By subjecting the above compounds to the process of Example 5, there are obtained the corresponding Δ1,4 compounds, that is, 6α-methyl-9α-trifluoromethylprednisolone, 6α,16α - dimethyl-9α-trifluoromethylprednisolone, 6α,16β, dimethyl - 9α-trifluoromethylprednisolone and 6α-methyl-9α-difluoromethylprednisolone.

By repeating the procedure of Example 6, using the above 9α-trifluoromethyl and 9α-difluoromethyl compounds, the corresponding C–6, 7 dihydro derivatives are obtained, for example, 6 - methyl - 9α - trifluoromethyl-11β,17α,21-trihydroxypregn-4,6-diene-3,20-dione 6,16α-dimethyl - 9α-trifluoromethyl-11β,17α,21-trihydroxypregna-1,4,6-triene-3,20-dione, etc.

Example 24

A mixture of 1 g. of 6α-methyl-9α-trifluoromethyl-11β,17α,21 - trihydroxypregn - 4 - ene-3,20-dione, 4 ml. of pyridine and 2 ml. of acetic anhydride is allowed to stand at room temperature for 15 hours. The mixture is then poured into ice water and the solid which forms is collected by filtration, washed with water and dried to yield 6α - methyl - 9α - trifluoromethyl-11β,17α,21-trihydroxypregn-4-ene-3,20-dione-21-acetate which may be further purified through recrystallization from acetone:hexane.

Example 25

By subjecting the 21-acetate obtained in the preceding example to oxidation by treatment with chromic trioxide as described in Example 14, there is obtained 6α-methyl-9α-trifluoromethyl-17α,21-dihydroxypregn-4-ene-3,11,20-trione-21-acetate.

This compound may be hydrolyzed by treatment with potassium hydroxide in methanol according to the procedure of Example 12 to obtain 6α-methyl-9α-trifluoromethyl-17α,21-dihydroxypregn-4-ene-3,11,20-trione.

Example 26

A mixture of 1 g. of 6α-methyl-9α-trifluoromethyl-17α,21-dihydroxypregn-4-ene-3,11,20-trione-21-acetate, 1 g. of p-toluenesulfonic acid monohydrate, 50 ml. of acetic acid and 25 ml. of acetic anhydride is allowed to stand at room temperature for 24 hours, and then is poured into water and stirred. This mixture is then extracted with methylene chloride and these extracts are dried and evaporated. The residue is then dissolved in 250 ml. of methanol containing 5 ml. of concentrated hydrochloric acid. After refluxing for one hour, the mixture is neutralized with an aqueous 10% solution of potassium bicarbonate and evaporated. The residue is extracted with methylene chloride, and the methylene chloride extract is washed with water to neutrality, dried and evaporated to yield 6α-methyl-9α-trifluoromethyl-17α,21-dihydroxypregn-4-ene-3,11,20-trione-17,21-diacetate, which is recrystallized from acetone:ether.

Example 27

By treating 6α-methyl-9α-trifluoromethyl-17α,21-dihydroxypregn-4-ene-3,11,20-trione with chloranil in t-butanol by the procedure described in Example 6, there is obtained 6-methyl-9α-trifluoromethyl - 17α,21-dihydroxypregn-4,6-diene-3,11,20-trione.

Treatment of this 4,6-diene compound with selenium dioxide according to the procedure of Example 5 to effect dehydrogenation at C-1,2, furnishes 6-methyl - 9α-trifluoromethyl - 17α,21-dihydroxypregna - 1,4,6-triene - 3, 11,20-trione.

Example 28

By repeating the process of Example 5 using 6α-methyl-9α-trifluoromethyl - 17α,21-dihydroxypregn - 4-ene-3,11, 20-trione as the starting material, there is obtained 6α-methyl - 9α-trifluoromethylprednisone (6α-methyl-9α-trifluoromethyl - 17α,21-dihydroxypregna - 1,4-diene-3,11, 20-trione).

Example 29

To a suspension of 1 g. of 9α-trifluoromethyl-17α,21-dihydroxypregn-4-ene-3,11,20-trione in 7.5 ml. of anhydrous, peroxide-free dioxane are added 1.2 ml. of freshly distilled ethyl orthoformate and 0.8 g. of p-toluenesulfonic acid. The mixture is stirred at room temperature for 15 minutes and then allowed to stand at room temperature for 30 minutes. There is then added 0.8 ml. of pyridine, followed by water until solidification occurs. This solid is collected by filtration, washed with water and air dried to yield 3-ethoxy-9α-trifluoromethyl-17α, 21-dihydroxypregna - 3,5-diene-11,20-dione which is recrystallized from acetone:hexane.

A stream of perchloryl fluoride is passed through a solution of 1 g. of the above enol ether in 25 ml. of dimethylformamide, cooled to 0° C., for 5 minutes. After being allowed to slowly attain a temperature of 20° C., the solution is poured into water and extracted with ethyl acetate. These extracts are washed with saturated aqueous sodium bicarbonate solution and with water to neutrality, dried over sodium sulfate and evaporated to dryness. The residue is then chromatographed on alumina to separate the 6α-fluoro and 6β-fluoro isomers. The latter, which predominates, is dissolved in 50 ml. of glacial acetic acid and through this solution is passed a stream of dry hydrogen chloride for a period of 24 hours and at a temperature of 15° C. The mixture is poured into cold water and the solid which forms is collected by filtration, washed with water and dried to yield 6α-fluoro-9α-trifluoromethyl-17α,21-dihydroxypregna - 4-ene-3,11,20-trione (6α-fluoro-9α-trifluoromethylcortisone) which is recrystallized from acetone:hexane.

By repeating the process of the process of this example using as the starting material 9α-trifluoromethylhydrocortisone, 9α-difluoromethylcortisone, 9α-trifluoromethyl-16β-methylhydrocortisone, 9α-trifluoromethyl-16α-methylhydrocortisone, 9α-trifluoromethyl - 16α-methylcortisone, 9α-trifluoromethyl - 16β-methylcortisone and 9α-difluoromethyl - 16β-methylcortisone, there are obtained the corresponding 6α-fluoro compounds.

By using the above 6α-fluoro-9α-trifluoromethyl and 6α-fluoro-9α-difluoromethyl compounds as the starting materials in the process of Example 5, the corresponding Δ$^{1,4}$ derivatives are obtained e.g. 6α-fluoro-9α-trifluoromethylprednisone, 6α-fluoro-9α-trifluoromethylprednisolone, 6α-fluoro-9α-trifluoromethyl - 16β-methylprednisolone, 6α-fluoro-9α-trifluoromethyl - 16α-methylprednisolone, 6α-fluoro-9α-difluoromethylprednisone.

Example 30

By treating 6α-fluoro-9α-trifluoromethylcortisone according to the acylation procedure of Example 22, the corresponding 17α-acylate is obtained.

Similarly, the other 6-fluoro-9α-trifluoromethyl and 6-fluoro-9α-difluoromethyl compounds of the present invention are transformed into the corresponding 17α-acylate, e.g. 6α-fluoro-9α-trifluoromethyl - 16β-methylprednisolone - 17-valerate, 6α-fluoro - 16α-methylprednisolone-17-valerate, 6α-fluoro - 9α-difluoromethylprednisone-17-acetate, etc.

Example 31

A mixture of 22 ml. of trimethylacetyl chloride, and 8.82 g. of 6α-fluoro-9α-trifluoromethyl - 16α-methylprednisolone, dissolved in 90 ml. of pyridine is slowly added to 350 ml. of pyridine under continuous stirring in a nitrogen atmosphere at 0° C. The reaction mixture is then left to stand under nitrogen at room temperature and is thereafter poured into ice-cooled diluted hydrochloric acid and the resulting precipitate extracted with acetic acid ether. The extract is then washed with hydrochloric acid and sodium carbonate and concentrated under vacuum to furnish the 21-trimethyl acetate.

Example 32

By treating 6α-fluoro-9α-trifluoromethyl - 17α,21-dihydroxy-pregn-4-ene-3,11,20-trione according to the dehydrogenation procedure of Example 6, there is obtained 6-fluoro - 9α-trifluoromethyl - 17α,21-dihydroxypregna-4,6-diene-3,11,20-trione.

Example 33

By repeating the process of Example 5 using the 4,6-diene of the preceding example or 6α-fluoro-9α-trifluoromethyl - 17α,21-dihydroxypregn - 4-ene-3,11,20-trione as the starting material, there is obtained 6-fluoro-9α-trifluoromethyl - 17α,21-dihydroxypregna-1,4,6-triene-3,11,20-trione and 6α-fluoro-9α-trifluoromethylprednisone, respectively.

Example 34

To a solution of 5 g. of 9α-trifluoromethyl-17α,21-dihydroxypregna - 4,6-diene-3,11,20-trione in 200 ml. of chloroform are added 40 ml. of 37% aqueous formaldehyde and 5 ml. of concentrated hydrochloric acid. The mixture is stirred for 48 hours at room temperature and the two layers then separated. The aqueous layer is extracted with chloroform and the combined organic layer and chloroform extracts are washed with water to neutrality, dried over sodium sulfate and evaporated to dryness to yield 9α-trifluoromethyl - 17α,20; 20,21-bismethylenedioxypregna-4,6-diene-3,11-dione which is recrystallized from methanol:ether.

By repeating the process of this example using as the starting material, other 9α-trifluoromethyl- and 9α-difluoromethyl-6,7-dehydro derivatives of cortisone and hydrocortisone, the corresponding 17α,20; 20,21-bismethylenedioxy compounds are obtained e.g. 17α,20; 20,21-bismethylenedioxy - 9α-trifluoromethyl - 16α-methyl - 11β-hydroxypregna - 4,6-dien-3-one, 17α,20; 20,21-bismethylenedioxy-9α-difluoromethyl - 16α-methyl - 11β-hydroxypregna-4,6-dien-3-one, etc.

Example 35

To a gently refluxing and stirred solution of 1 g. of the compound of the preceding example in 8 ml. of dimethyl diethyleneglycol ether is added in a dropwise fashion over a two-hour period, a solution of 30 equivalents of sodium chlorodifluoroacetate in 30 ml. of dimethyl diethyleneglycol ether. At the end of the reaction period which may be followed by the U.V. spectra, the mixture is filtered and evaporated in vacuo to dryness. The residue is added to 10% methanolic potassium hydroxide and this mixture is heated briefly at reflux and poured into ice water. The solid which forms is collected, washed with water, dried and chromatographed on alumina, eluting with methylene chloride, to yield 6α,7α-difluoromethylene-9α-trifluoromethyl-17α,20; 20,21-bismethylenedioxypregn-4-ene-3,11-dione.

A suspension of 1 g. of this compound in 10 ml. of 48% aqueous hydrofluoric acid is stirred at 0° C. for 90 minutes. At the end of this time, the reaction mixture is neutralized with 5% aqueous potassium bicarbonate solution and extracted with ethyl acetate. These extracts are evaporated to dryness under reduced pressure and chromatographed on silica gel with 2:1 hexane:ethyl acetate to yield 6α,7α-difluoromethylene-9α-trifluoromethylcortisone which may be further purified through recrystallization from isopropanol.

In a similar manner, the other 9α-trifluoromethyl-Δ$^{4,6}$ and 9α-difluoromethyl-Δ$^{4,6}$ compounds of the present invention are converted into the 6α,7α-difluoromethylene derivative, e.g. 6α,7α-difluoromethylene-9α-trifluoromethyl - 16α-methyl-hydrocortisone, 6α,7α-difluoromethylene-9α-difluoromethyl-16α-methyl-hydrocortisone.

Example 36

A solution of 1 g. of 9α-trifluoromethyl-17α,20; 20,21-bismethylenedioxypregna-4,6-diene-3,11-dione in 10 ml. of dimethylsulfoxide is added to a solution of 1 equivalent of dimethylsulfoxonium methylide in dimethylsulfoxide. The mixture is stirred under nitrogen at room temperature for 20 hours and at 50° C. for about 7 hours. Fifty ml. of water are then added and the resulting mixture is extracted four times with 100 ml. portions of ethyl acetate. The combined extracts are washed with water and saturated aqueous sodium chloride solution, dried, and evaporated to dryness. This residue is then chromatographed on silica, eluting with ether:methylene chloride (1:9) to yield 6α,7α-methylene-9α-trifluoromethyl-17α,20; 20,21-bismethylenedioxypregn-4-ene-3,11-dione.

A suspension of 1 g. of this compound in 10 ml. of 48% aqueous hydrofluoric acid is stirred at 0° C. for 90 minutes. At the end of this time, the reaction mixture is neutralized with 5% aqueous potassium bicarbonate solution and extracted with ethyl acetate. These extracts are evaporated to dryness under reduced pressure and chromatographed on silica gel with 2:1 hexane:ethyl acetate to yield 6α,7α-methylene-9α-trifluoromethylcortisone which may be further purified through recrystallization from isopropanol.

Likewise, by repeating the process of this example using other 9α-trifluoromethyl-Δ$^{4,6}$ and 9α-difluoromethyl-Δ$^{4,6}$ compounds of the present invention, there are obtained other 6α,7α-methylene derivatives, e.g. 6α,7α-methylene-9α - trifluoromethyl - hydrocortisone, 6α,7α-methylene-9α-difluoromethyl - cortisone, 6α,7α - methylene-9α - trifluoromethyl-16α-methyl-cortisone, and 6α,7α-methylene-9α-trifluoromethyl-16α-methyl-hydrocortisone.

Example 37

A mixture of 0.5 g. of 6α,7α-difluoromethylene-9α-trifluoromethyl - 17α,21 - dihydroxypregn - 4 - ene - 3,11-20 trione, 10 ml. of dioxane and 0.35 g. of 2,3-dichloro-5,6-dicyano-1,4-benzoquinone is refluxed for 10 hours. The mixture is then cooled, filtered and evaporated to dryness. The residue is dissolved in acetone and concentrated to yield 6α,7α - difluoromethylene - 9α - trifluoromethyl-prednisone which is further purified by recrystallization from acetone:hexane.

By the use of the process of this example, other 6α,7α-difluoromethylene and 6α,7α-methylene derivatives of the 9α - trifluoromethyl - Δ$^4$ and 9α - difluoromethyl - Δ$^4$ compounds of this invention are converted into the corresponding Δ$^{1,4}$-diene derivatives, e.g. 6α,7α-difluoromethylene-9α-trifluoromethyl-16α-methyl-prednisolone and 6α,7α - methylene - 9α - trifluoromethyl - 16α - methyl - prednisolone.

Example 38

To a stirred solution of 3 g. of 9α-trifluoromethyl-17α,20; 20,21-bismethylenedioxypregn-4-ene-3,11-dione in 60 ml. of anhydrous benzene is added, with cooling and under nitrogen, a suspension of 3 ml. of ethyl formate and 1.3 g. of sodium hydride in mineral oil. The mixture is stirred at room temperature for 24 hours and hexane is then added until complete precipitation occurs. The solid which forms is collected, dried under vacuum and suspended in aqueous hydrochloric acid. This suspension is stirred at room temperature for half an hour and then filtered. The solid thus collected is washed with water and dried to yield 2 - hydroxymethylene - 9α - trifluoromethyl - 17α,20; 20, 21-bismethylenedioxypregn - 4 - ene - 3,11 - dione which is recrystallized from methylene chloride:hexane.

To a suspension of 1.2 g. of the above 2-hydroxy methylene-9α-trifluoromethyl compound and 0.22 g. of sodium acetate in 25 ml. of ethanol is added under nitrogen 0.25 g. of p-fluorophenylhydrazine hydrochloride. The mixture is heated at reflux under nitrogen for one hour and then evaporated to dryness. The residue is washed three times with 2.5 N hydrochloric acid, three times with 2.5 N sodium hydroxide and finally with water, dried over magnesium sulfate, filtered and evaporated to dryness in vacuo to yield a residue containing 9α-trifluoromethyl-17α,20;20,21 - bismethylenedioxypregn-4-en-11-one-3,2-C-2'-p-fluorophenylpyrazole which may be recrystallized from methanol.

The thus-obtained pyrazole is treated with aqueous hydrofluoric acid according to the procedure described in the second paragraph of Example 36 above to yield 9α-trifluoromethyl - 17α,21 - dihydroxypregn - 4 - ene - 11,20-dione-3,2-C-2'-p-fluorophenyl pyrazole.

By repeating the process of this example using as the starting material other 9α-trifluoromethyl-Δ$^4$ and 9α-difluoromethyl-Δ$^4$ compounds of this invention, the corresponding pyrazole derivatives are obtained, e.g.

9α-trifluoromethyl-6α,7α-methylene-16α-methyl-11β, 17α,21-trihydroxypregn-4-en-20-one-3,2-C-2'-p-fluorophenylpyrazole, 9α-trifluoromethyl-11β,17α,21-trihydroxy-6,16α-dimethylpregna-4,6-dien-20-one-3,2-C-2'-p-fluorophenylpyrazole, 9α-trifluoromethyl-6α,7α-difluoromethylene-17α,21-dihydroxypregn-4-ene-1,20-dione-3,2-C-2'-p-fluorophenylpyrazole, 9α-trifluoromethyl-6α,7α-difluoromethylene-17α,21-dihydroxypregn-4-ene-11,20-dione-3,2-C-2'-p-fluorophenylpyrazole, 9α-trifluoromethyl-16α-methyl-11β,17α,21-trihydroxypregn-4-en-20-one-3,2-C-2'-p-fluorophenylpyrazole, etc.

Similarly, by using other hydrazines, e.g. phenyl hydrazine hydrochloride, in place of p-fluorophenylhydrazine hydrochloride in the process of this example, the corresponding 3,2-C-2'-phenylpyrazoles are obtained, e.g. 9α - trifluoromethyl-17α,21-dihydroxypregn-4-ene-11,20-dione-3,2-C-2'-phenylpyrazole, etc.

Similarly, use of an equivalent amount of hydrazine hydrate in the foregoing procedure, the corresponding 2'-unsubstituted-pyrazoles are obtained, e.g. 9α-trifluoromethyl - 17α,21-dihydroxypregn-4-ene-11,20-dione-3,2-C pyrazole.

Likewise, by the use of other hydrazines such as o-, m- and p-methylphenylhydrazine, o-, m- and p-methoxyphenylhydrazine and o-, m- and p-chlorophenylhydrazine in the foregoing procedure, there are obtained the corresponding 3,2-C pyrazoles substituted in the 2'-position by o-methylphenyl, m-methylphenyl, p-methylphenyl, o-methoxyphenyl, m-methoxyphenyl, p-methoxyphenyl, o-chlorophenyl, m-chlorophenyl, and p-chloropenyl, respectively, preferably para compounds.

Example 39

A culture of *Streptomyces roseochromogenus* A.T.T.C. No. 3347 is prepared in an inclined agar medium containing 1% of glucose and 1% of yeast extract. 1 cc. of a suspension of this culture is then used to inoculate each one of a series of 250 cc. flasks containing 50 cc. of a sterilized aqueous medium of 2% peptone and 5% corn syrup; the mixture is then incubated in a shaking machine at 28° C. under aeration for a period of 24–48 hours. There is thus obtained a vegetating growing culture of *Streptomyces roseochromogenus* which is used for the subsequent incubating of the steroid.

10 g. of 9α-difluoromethyl-17α,21-dihydroxypregn-4-ene-3,11-dione (9α-difluoromethyl-cortisone) is added to each 50 cc. of the vegetating culture of *Streptomyces roseochromogenus*, obtained as described above. The mixture is stirred for 48–72 hours with aeration and then extracted several times with methylene dichloride. The extract is washed with water, dried over anhydrous sodium sulfate, filtered and evaporated to dryness under reduced pressure.

The residue is purified by chromatography on silica thus giving 9α-difluoromethyl-16α-hydroxy-cortisone.

Example 40

By the method described in the preceding example, except that in some cases the incubation is extended to over 72 hours, there is obtained from 9α-difluoromethyl and 9α-trifluoromethyl derivatives of cortisone, hydrocortisone, prednisolone, and prednisone, the corresponding 9α - difluoromethyl-16α-hydroxy and 9α-trifluoromethyl-16α-hydroxy derivatives of such cortical hormones. In a similar manner, other derivatives of the 9α-trifluoromethyl and 9α-difluoromethyl compounds of the present invention, e.g. the 6α-fluoro and 6α-methyl derivatives are converted into the 16α-hydroxy substituted compounds.

Example 41

To 120 ml. of acetone containing 1 g. of 9α-difluoromethyl - 16α,17α,21-trihydroxypregn-4-ene-3,11-dione are added 30 drops of 70% perchloric acid. The mixture is allowed to stand 1 hour at room temperature, 30 drops of pyridine are added and the solution is evaporated to dryness under reduced pressure. Thirty milliliters of water are added to the residue and this mixture is extracted several times with ethyl acetate. The combined extracts are washed to neutrality with water, dried over sodium sulfate and evaporated to dryness. The residue upon trituration with methanol yields 16α,17α-isopropylidenedioxy - 9α-difluoromethyl-21-hydroxypregn-4-ene-3,11-dione which is recrystallized from methanol.

By applying the foregoing procedure to other 9α-trifluoromethyl-16α,17α-diol and 9α-difluoromethyl-16α,17α-diol compounds of the present invention, the corresponding 16α,17α-acetonide derivatives are obtained, e.g. the 16α,17α-acetonide of 9α-trifluoromethyl-16α-hydroxyprednisolone,
9α-trifluoromethyl-6α-fluoro-16α-hydroxy-cortisone,
9α-difluoromethyl-6α-fluoro-16α-hydroxy-cortisone,
9α-trifluoromethyl-6α-fluoro-16α-hydroxyprednisone,
9α-trifluoromethyl-6-fluoro-16α-hydroxyprednisolone,
9α-trifluoromethyl-6-fluoro-6,7-dehydro-16α-hydroxyprednisolone,
9α-trifluoromethyl-6α-methyl-16α-hydroxycortisone,
9α-trifluoromethyl-6α,7α-difluoromethylene-16α-hydroxyprednisone,
9α,trifluoromethyl-6α,7α-difluoromethylene-16α-hydroxyhydrocortisone,
9α-trifluoromethyl-6-methyl-6,7-dehydro-16α-hydroxycortisone,
9α-trifluoromethyl-6β-fluoro-6α,7α-difluoromethylene-16α-hydroxycortisone, etc.

The 21-acylate of the foregoing compounds can be obtained by treatment with a carboxylic anhydride, e.g. acetic anhydride, propionic anhydride, and the like, in pyridine according to the method of Example 26 furnishing the corresponding 21-acetate, 21-propionate, and the like.

Example 42

The method of Example 41 is repeated using acetaldehyde in place of acetone and the corresponding 16α,17α-ethylidenedioxy derivatives are obtained which can thereafter be subjected to acetylation to obtain the 21-acylate, e.g. the 21-acetate in the manner described above. Thus, there are obtained 16α,17α-ethylidenedioxy derivatives of e.g. 9α-trifluoromethyl-16α-hydroxy-cortisone and the 21-acetate thereof, 9α-trifluoromethyl-16α,17α,21-trihydroxypregn - 4 - ene-11,20-dione-3,2-C-2'-p-fluorophenyl pyrazole and the 21-acetate thereof, etc.

Example 43

A mixture containing 1 g. of 9α-trifluoromethyl-17α-acetoxy-21-hydroxypregn-4-ene-3,11,20-trione, 10 ml. of acetic acid, 10 ml. of water, and 9 grams of zinc is heated at steam bath temperatures with stirring for about two hours. Thereafter, the reaction mixture is allowed to cool to room temperature and filtered. The filtrate is neutralized by the addition of potassium bicarbonate, diluted with 30 ml. of chloroform, and separated. The organic phase is then washed with water, dried and evaporated to dryness to yield 9α-trifluoromethyl-21-hydroxypregn-4-ene-3,11,20-trione.

Using the process of this example, other 9α-trifluoromethyl and 9α-difluoromethyl derivatives of this invention having a free hydroxy group or an ester group, preferably the acetate, at C–17 can be converted into the 17-desoxy derivatives.

Example 44

To 50 ml. of a 0.43 N solution of chromous chloride in acetic acid is added a solution of 1 g. of 9α-difluoromethyl - 17α - acetoxy-21-hydroxypregn-4-ene-3,11,20-trione in aqueous acetic acid, under nitrogen. After about 30 minutes at room temperature, the reaction mixture is diluted with methylene chloride and ice water. The reaction mixture is then separated and the organic phase is washed, dried and evaporated to yield 9α-difluoromethyl-21-hydroxypregn-4-ene-3,11,20-trione which may be purified by crystallization from acetone:petroleum ether.

What is claimed is:
1. A compound selected from the group consisting of those having the formulas

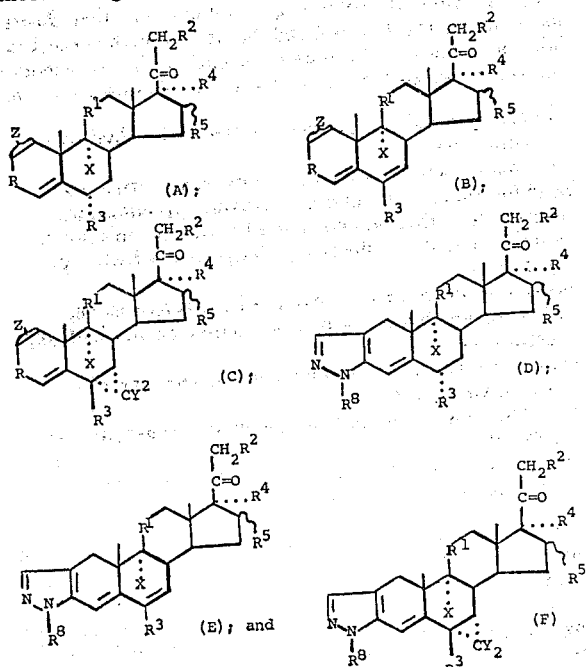

wherein X is selected from the group consisting of difluoromethyl and trifluoromethyl; Y is selected from the group consisting of hydrogen and fluoro; Z is selected from the group consisting of a saturated bond and an ethylenically unsaturated bond between carbon-1 and carbon-2; R is selected from the group consisting of $>C=O$ and

wherein R'' is selected from the group consisting of hydroxy, a carboxylic acyloxy group of less than 12 carbon atoms, tetrahydropyran-2-yloxy, and tetrahydrofuran-2-yloxy; $R^1$ is selected from the group consisting of $>C=O$ and

$R^2$ is selected from the group consisting of hydroxy and a carboxylic acyloxy group of less than 12 carbon atoms; $R^3$ is selected from the group consisting of hydrogen, fluoro and methyl; $R^4$ is selected from the group consisting of hydrogen, hydroxy, and a carboxylic acyloxy group of less than 12 carbon atoms; $R^5$ is selected from the group consisting of hydrogen, alpha hydroxy, alpha methyl, and beta methyl; $R^4$ and $R^5$ together form the group

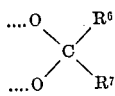

at the 16α,17α-position wherein each of $R^6$ and $R^7$ is selected from the group consisting of hydrogen and a hydrocarbon group of up to 8 carbon atoms; and $R^8$ is selected from the group consisting of hydrogen, phenyl, chlorophenyl, fluorophenyl, methoxyphenyl and methylphenyl, provided that when $R^5$ is alpha hydroxy that $R^4$ is selected from the group consisting of hydroxy and a carboxylic acyloxy group of less than 12 carbon atoms.
2. A compound according to Formula A of claim 1 wherein Z is an ethylenically unsaturated bond between carbon-1 and carbon-2, R is $>C=O$, and $R^1$ is

3. A compound according to claim 2 wherein $R^2$ and $R^4$ are each hydroxy and $R^3$ and $R^5$ are each hydrogen.
4. A compound according to claim 2 wherein $R^2$ and $R^4$ are each hydroxy, $R^3$ is fluoro and $R^5$ is hydrogen.
5. A compound according to claim 2 wherein $R^2$ and $R^4$ are each hydroxy, $R^3$ is fluoro, and $R^5$ is alpha methyl.
6. A compound according to claim 2 wherein $R^2$ is hydroxy, $R^3$ is fluoro, $R^4$ is pentanoyloxy and $R^5$ is alpha methyl.
7. A compound according to claim 2 wherein $R^2$ and $R^4$ are each hydroxy, $R^3$ is methyl, and $R^5$ is hydrogen.
8. A compound according to claim 2 wherein $R^2$ and $R^4$ are each hydroxy, $R^3$ is hydrogen, and $R^5$ is beta methyl.
9. A compound according to claim 2 wherein $R^2$ is hydroxy, $R^3$ is hydrogen, $R^4$ is pentanoyloxy and $R^5$ is beta methyl.
10. A compound according to claim 2 wherein $R^2$ and $R^4$ are each hydroxy, $R^3$ is fluoro, and $R^5$ is beta methyl.
11. A compound according to claim 2 wherein $R^2$ is hydroxy, $R^3$ is fluoro, $R^4$ is pentanoyloxy, and $R^5$ is beta methyl.
12. A compound according to claim 2 wherein $R^2$ is hydroxy, $R^3$ is fluoro, and $R^4$ and $R^5$ together form the group

at the 16α,17α-position wherein each of $R^6$ and $R^7$ is selected from the group consisting of hydrogen and a hydrocarbon group of up to 8 carbon atoms.
13. A compound according to claim 2 wherein $R^2$ is hydroxy, $R^3$ is hydrogen, and $R^4$ and $R^5$ together form the group

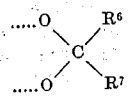

at the 16α,17α-position wherein each of $R^6$ and $R^7$ is selected from the group consisting of hydrogen and a hydrocarbon group of up to 8 carbon atoms.
14. A compound according to claim 2 wherein $R^2$ is trimethylacetoxy, $R^3$ is fluoro, $R^4$ is hydroxy and $R^5$ is alpha methyl.
15. A compound according to Formula A of claim 1 wherein Z is an ethylenically unsaturated bond between carbon-1 and carbon-2 and R is $>C=O$.
16. A compound according to Formula A of claim 1 wherein $R^2$ and $R^4$ are each hydroxy and R is $>C=O$.
17. A compound according to Formula B of claim 1 wherein R is $>C=O$, $R^1$ is

$R^2$ and $R^4$ are each hydroxy, $R^3$ is methyl, $R^5$ is alpha methyl, and Z is an ethylenically unsaturated bond between carbon-1 and carbon-2.
18. A compound according to Formula C of claim 1 wherein R is $>C=O$, $R^1$ is

$R^2$ and $R^4$ are each hydroxy, $R^3$ is hydrogen, $R^5$ is alpha methyl, Y is fluoro and Z is an ethylenically unsaturated bond between carbon-1 and carbon-2.

19. A compound according to Formula D of claim 1 wherein R¹ is

R² and R⁴ are each hydroxy, R³ is hydrogen, R⁵ is alpha methyl and R⁸ is para-fluorophenyl.

20. A compound according to Formula E of claim 1 wherein R¹ is

R² and R⁴ are each hydroxy, R³ is methyl, R⁵ is alpha methyl, and R⁸ is para-fluorophenyl.

21. A compound according to Formula F of claim 1 wherein R¹ is

R² and R⁴ are each hydroxy, R³ is hydrogen, R⁵ is alpha methyl, Y is hydrogen, and R⁸ is para-fluorophenyl.

References Cited

UNITED STATES PATENTS 3,338,928  8/1967  Beard et al. _____ 260—397.4
3,364,203  1/1968  Beard et al. _____ 260—239.5

LEWIS GOTTS, *Primary Examiner.*

E. G. LOVE, *Assistant Examiner.*